US011667448B2

(12) United States Patent
Bell et al.

(10) Patent No.: US 11,667,448 B2
(45) Date of Patent: Jun. 6, 2023

(54) RECLOSABLE FLAP DEVICE

(71) Applicant: OPM ADVANCE LIMITED, Leeds (GB)

(72) Inventors: Ian David Michael Bell, Leeds (GB); Christopher John Ellison, Leeds (GB)

(73) Assignee: OPM ADVANCE LIMITED, Leeds (GB)

(*) Notice: Subject to any disclaimer, the term of this patent is extended or adjusted under 35 U.S.C. 154(b) by 296 days.

(21) Appl. No.: 16/909,611

(22) Filed: Jun. 23, 2020

(65) Prior Publication Data
US 2020/0317417 A1 Oct. 8, 2020

Related U.S. Application Data

(63) Continuation of application No. 15/570,635, filed as application No. PCT/GB2016/051752 on Jun. 13, 2016, now Pat. No. 10,730,677.

(30) Foreign Application Priority Data

Jun. 12, 2015 (GB) ..................................... 1510378
Dec. 22, 2015 (GB) ..................................... 1522698

(51) Int. Cl.
*B65D 75/58* (2006.01)
*B32B 38/04* (2006.01)
(Continued)

(52) U.S. Cl.
CPC .......... *B65D 75/5838* (2013.01); *B32B 37/12* (2013.01); *B32B 37/144* (2013.01);
(Continued)

(58) Field of Classification Search
CPC .. B65D 75/5838; B65D 75/566; B32B 38/10; B32B 38/04; B32B 38/047;
(Continued)

(56) References Cited

U.S. PATENT DOCUMENTS 1,492,100 A   4/1924   Krueger
2,050,967 A   8/1936   Farmer
(Continued)

FOREIGN PATENT DOCUMENTS

DE    7603597.2 U1   7/1976
EP    1364887 A1    11/2003
(Continued)

OTHER PUBLICATIONS

Patents Act 1977: Combined Search and Examination Report under Sections 17 and 18(3), UKIPO Application No. GB1510378.1, dated Jul. 24, 2015, 6 pp.
(Continued)

*Primary Examiner* — Carson Gross
(74) *Attorney, Agent, or Firm* — Myers Bigel, P.A.

(57) ABSTRACT

A resealable flap device in the form of a sheet, for applying to or incorporating in packaging, comprises: a base layer 30 of flexible material, and an upper layer 40 of stiff material. The sheet is cut (15) through both layers to outline a flap portion 14, the cut leaving an edge in a hinge region 18, the upper layer being removed behind the line of the hinge region 18. In this way the flexible base layer forms a hinge 18 that is easy to handle and does not spring back, while the stiff upper layer maintains the shape of the flap.

15 Claims, 8 Drawing Sheets

(51) Int. Cl.
  *B65D 33/14*  (2006.01)
  *B65D 75/56*  (2006.01)
  *B32B 37/14*  (2006.01)
  *B32B 38/10*  (2006.01)
  *B32B 37/12*  (2006.01)
  *B65D 83/08*  (2006.01)

(52) U.S. Cl.
  CPC .............. *B32B 38/04* (2013.01); *B32B 38/10* (2013.01); *B65D 33/14* (2013.01); *B65D 75/566* (2013.01); *B65D 75/58* (2013.01); *B65D 75/5855* (2013.01); *B65D 83/0805* (2013.01); *B65D 2575/565* (2013.01)

(58) Field of Classification Search
  CPC ......... Y10T 156/1052; Y10T 156/1062; Y10T 156/1064
  See application file for complete search history.

(56) References Cited

U.S. PATENT DOCUMENTS

| | | | |
|---|---|---|---|
| 4,679,693 | A | 7/1987 | Forman |
| 6,026,953 | A | 2/2000 | Nakamura et al. |
| 6,858,108 | B2 | 2/2005 | Matthews et al. |
| 2016/0176572 | A1* | 6/2016 | Rodon ................... B65D 51/20 220/258.2 |
| 2016/0251136 | A1* | 9/2016 | Gamundi Masque . B65D 75/26 220/270 |

FOREIGN PATENT DOCUMENTS

| | | | | |
|---|---|---|---|---|
| EP | 2 202 176 | A1 | 6/2010 | |
| EP | 2202176 | A1 * | 6/2010 | ......... B65D 75/5838 |
| EP | 2 308 773 | A1 | 4/2011 | |
| GB | 2534958 | A * | 8/2016 | ........... B65D 43/161 |
| GB | 2534958 | A | 8/2016 | |
| GB | 2539331 | B | 9/2017 | |
| JP | 10-17037 | A | 1/1998 | |
| JP | 11-268783 | A | 10/1999 | |
| JP | 2010089805 | A | 4/2010 | |
| JP | 2013-159365 | A | 8/2013 | |
| WO | WO 86/06350 | A1 | 11/1986 | |
| WO | WO 2011/001580 | A1 | 1/2011 | |
| WO | WO 2015/056061 | A1 | 4/2015 | |

OTHER PUBLICATIONS

Patents Act 1977: Combined Search and Examination Report under Sections 17 and 18(3), UKIPO Application No. GB1522698.8, dated Mar. 14, 2016, 6 pp.
Patents Act 1977: Combined Search and Examination Report under Sections 17 and 18(3), UKIPO Application No. GB1610242.8, dated Jul. 22, 2016, 7 pp.
Patents Act 1977: Combined Search and Examination Report under Sections 17 and 18(3), UKIPO Application No. GB1610242.8, dated Jan. 16, 2017, 6 pp.
International Search Report and Written Opinion of the International Searching Authority, International Application No. PCT/GB2016/051752, dated Oct. 19, 2016, 16 pp.
Third Party Observation, International Application No. PCT/GB2016/051752, dated Jun. 15, 2017, 2 pp.
Patents Act 1977: Observations under Section 21, UKIPO Application No. GB1610242.8, dated Jun. 21, 2017, 26 pp.
Machine translation of JP 10-17037 A.
"Communication with European Search Report", EP Application No. 19191357.3, dated Aug. 7, 2020, 12 pp.
"Notice of Reasons for Refusal and English language translation", JP Application No. 2018-516644, dated Jul. 21, 2020, 7 pp.

* cited by examiner

RECLOSABLE FLAP DEVICE

RELATED APPLICATIONS

This application is a continuation of U.S. patent application Ser. No. 15/570,635, filed Oct. 30, 2017, which itself is a 35 U.S.C. § 371 national stage application of PCT Application No. PCT/GB2016/051752, filed on Jun. 13, 2016, which claims priority from Great Britain Patent Application No. 1510378.1 filed on Jun. 12, 2015, and from Great Britain Patent Application No. 1522698.8 filed on Dec. 22, 2015, the contents of which are incorporated herein by reference in their entireties. The above-referenced PCT International Application was published in the English language as International Publication No. WO 2016/198905 A1 on Dec. 15, 2016.

SUMMARY

The present invention relates to reclosable or resealable flaps such as are used, for instance, on packets of moist wipes ("wet wipes"). These packets are designed to retain the moisture of the wipes by sealing the package when not in use, but to allow easy opening and closing of the flap to allow access to a hole in the package material through which one or more moist wipes can be drawn. To this end, the flap generally has a tacky adhesive along the outer part of its lower surface, sticking to the package wall or film surrounding the hole, but allowing the user to pull the flap away from the package film. One edge of the flap will generally be permanently stuck to the package to act as a hinge.

One desirable feature of such a flap is that, once opened, it falls under its own weight so that it lies folded away from the opening and does not interfere with the wipes being removed. A design that aims to provide a reliable hinge is shown in EP 2202176 A1 by Prime Label & Screen, Inc. Here a resealable label flap is made of two main layers, a thicker base layer 28 and a top layer 30, in the form of a rectangle. In practice, the base layer may itself be made of two or more layers, for instance to ease the application of the resealable adhesive. The rectangle is cut around three edges inside its circumference to form a flap portion, the fourth end forming a hinge. This hinge is constituted by slitting the lower layer but not the upper layer, so that the flap portion hinges about the upper layer where it bridges the slit. The region of the rectangle outside the cut forms a frame which remains stuck to the package.

In practice it is not easy to handle the assembly after the subsequent cut has been made through both layers so as to define the outline of the flap portion. The present invention aims to provide a flap that is easier to manufacture and also more reliable.

Another construction, using composite layers and intending to solve the problem of the flap undesirably returning to cover the opening while one is trying to extract a wipe, is shown in WO 2011/001580 A1 by Unicharm Corporation. The flap is formed by two main layers, a thinner layer on top of a thick layer, the thin layer extending beyond one side of the lower layer and being fixed to the package by a strong adhesive. The construction appears not to solve the problem of the flap flipping back, because a transverse slit is formed in the upper layer over most of its transverse extent, so as to weaken the restoring force.

The present invention is defined in one aspect in claim 1 and is generally directed to a resealable flap device in the form of a sheet for applying to or incorporating in packaging, comprising:

a base or lower layer of flexible material; and
an upper layer of stiff material;
base and upper layers each having a layer of adhesive on their lower face, the adhesive on the upper layer bonding this layer to the lower layer;
wherein the sheet is cut through both layers to outline a flap portion, but leaving an edge uncut in a hinge region; and
the upper layer of the flap portion is not present on the outer part of the sheet beyond the line of the hinge region.

Because the region of the flap portion behind the hinge line has only the single lower layer, the lower layer at that line, or in its vicinity, forms the desired hinge, being much less stiff—say two to ten times—than the composite of the two layers, in terms of Young's Modulus.

In general, the upper layer in the frame portion (i.e. the outside region surrounding the flap portion) will also end approximately in line with the hinge, though it may extend beyond it to a greater or lesser extent for added stability.

A tab may be formed on the end of the flap portion remote from the hinge in the usual way, to make it easier for the user to lift the flap. Preferably there is no adhesive on the underside of the tab, or any adhesive present is covered or neutralised, but the remainder of the flap portion generally has a tacky adhesive for resealable sticking to the package.

The lower layer may be of a tough but flexible polymer such as polypropylene (PP), about 50 µm thick, the upper layer of the same or, preferably, a different material, such as polystyrene (PS) or PET, and preferably at least two or three times as thick, preferably at least 150 µm thick. The two are laminated using a suitable adhesive such as acrylic-based adhesive, and the reclosure adhesive under the base layer can be any usual adhesive for this purpose.

The flap may be generally rectangular, rounded, elliptical, oval or ogival in shape, though the hinge will generally be a straight line. The "north-south" direction of the flap, i.e. the direction in the plane in which the flap opens and closes, will be termed the "longitudinal" direction, the perpendicular direction in the plane of the flap (when closed) being termed "transverse". The "front" of the flap is that edge or end picked up by the user to open the flap.

In a further aspect, a resealable flap device in the form of a sheet for applying to or incorporating in packaging comprises a layer of flexible material, the layer being cut through to outline a flap portion, but leaving an edge uncut in a hinge region;

wherein the layer continues rearwardly and incorporates a second flap portion having a slot by which a product may be suspended when the flap device is fixed to the product.

The device is easy to manufacture because the upper layer can be formed by selective removal of parts of the upper layer to form the hinge region. This can be done, for instance, by cutting through the upper layer only and then removing the unwanted portion of the upper layer. In addition, printing a blocking agent to prevent adhesion between base and upper layers in certain areas may be helpful. Also, although the top surface of the laminate is not entirely smooth (because of the local absence of the top layer at the base of the hinge), this presents no practical (nor aesthetic) difficulty and it does not interfere with manufacture of the flap device itself, nor with assembly as it is applied to the pack.

It is to be understood that the upper and/or lower layers may be printed upon, for example for the purpose of colouring or shading the device, or to apply a logo or graphic or other printed material such as instructions or advertising material.

Print may be applied to one or both of an upper and lower side of the lower layer, and/or to one or both of an upper and lower side of the upper layer. Print may be applied before adhesive is applied to a layer, in which case the presence of the print typically does not adversely affect subsequent bonding of the layer to another surface. Alternatively print may be applied to all or a selected portion of an area of a surface of the upper or lower layers after a layer of adhesive has been applied to the surface. The presence of the layer of print on the adhesive essentially reduces or inhibits substantially entirely the ability of the adhesive in that area to cause the layer to stick to a surface that is subsequently brought into contact with the printed area.

This feature may be useful in some embodiments. For example, in embodiments having a tab formed on the end of the flap portion remote from the hinge, to make it easier for the user to lift the flap as described above, adhesive applied to the lower surface of the lower layer in order to allow the lower layer to be bonded to packaging may be printed upon in the region of the tab in order to prevent the tab from sticking to the packaging.

It is to be understood that, in addition or instead, the lower surface of the lower layer may be printed upon before adhesive is applied to that layer. In that case, it is typically the case that the adhesive will permit the printed (and any non-printed) regions of the lower layer to be bonded to the packaging to which the device is applied.

In addition or instead, the upper surface of the lower layer may be printed upon. In the case that a layer of adhesive is applied to the upper surface of the lower layer after printing upon the upper surface, the upper layer may subsequently be bonded to the lower layer even in regions in which print has been applied to the lower layer. However, if it is desired not to allow bonding of the upper and lower layers in certain regions, print may be applied to the adhesive after it has been applied to the upper surface of the lower layer or lower surface of the upper layer, to prevent adhesion in the printed areas.

If the upper and lower layers are both transparent, printed material on the lower layer or lower surface of the upper layer will be visible through the upper layer, and lower layer in the case of printing on the lower surface of the lower layer.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

For the avoidance of doubt, it is to be understood that features described with respect to one aspect of the invention may be included within any other aspect of the invention, alone or in appropriate combination with one or more other features.

BRIEF DESCRIPTION OF THE DRAWINGS

For a better understanding of the invention, embodiments will now be described with reference to the attached drawings, in which.

DETAILED DESCRIPTION

Figure 1:
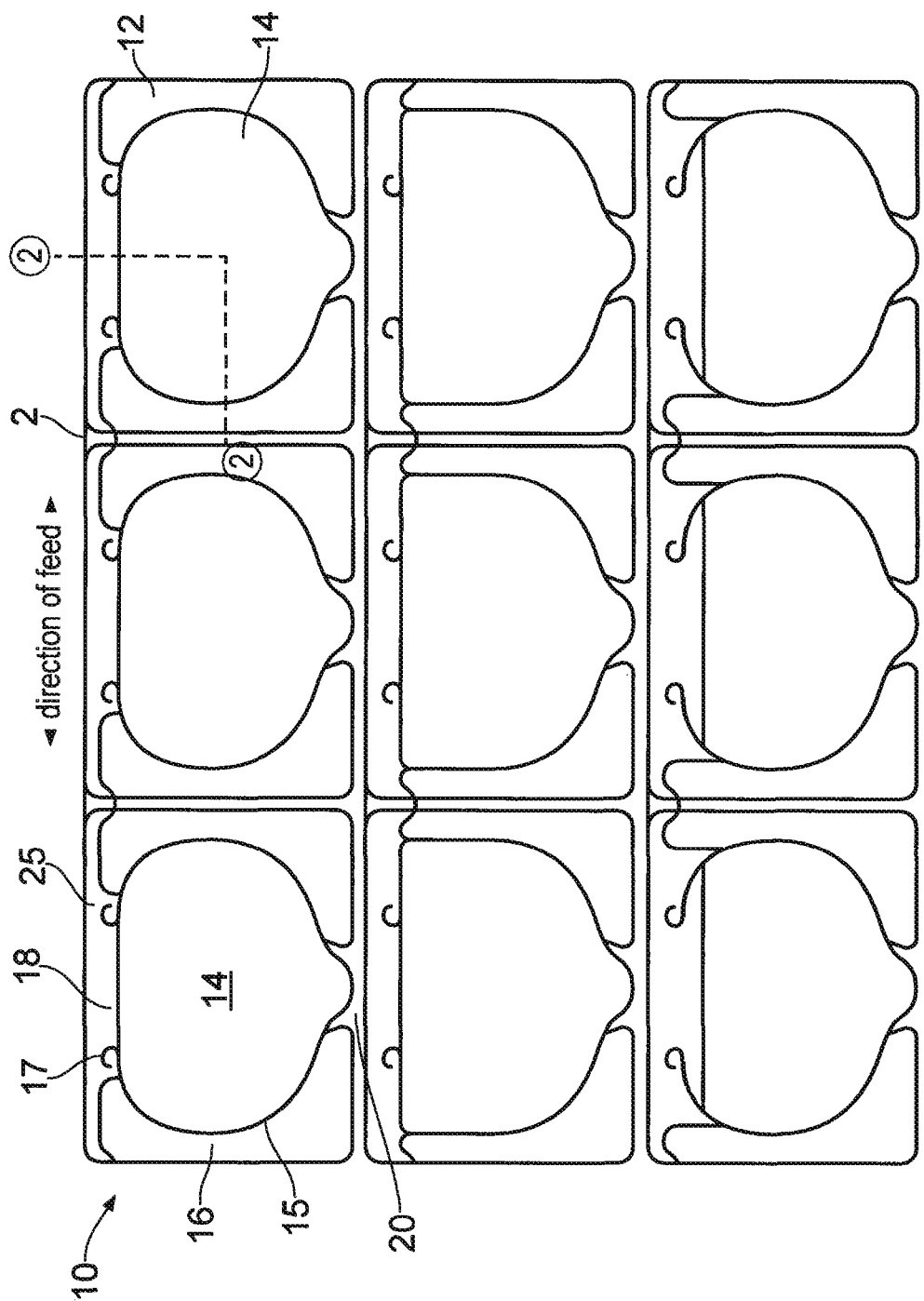
FIG. 1 is a view of a strip of flap devices ready to be applied to packages.

FIG. 1 shows a composite picture of three different versions of flap devices or "label flaps" in accordance with the invention, before their application to the packaging for which they are destined. That is, they are still mounted on a release or backing layer 2. All have the same basic features. The individual label flaps or flap devices 10 are arranged in rows on a release layer 1. Each has a generally rectangular shape, out of which, by a cut 15, is cut a flap portion 14, leaving a surrounding frame 12, which is in fact composed of two pieces each of a "mutton chop" shape.

The cut extends only over three sides of the rectangle, leaving a hinge 18, forming the rear end of the flap in the longitudinal direction, i.e. the direction in which the flap is opened and closed. At the side or front end opposite the hinge is a protruding nose acting as a tab 20 when the device is in use.

The label flap is in two main layers, though other layers, such as adhesives, may be present also. The lower layer is present over all the area of the label flap as shown, while the upper layer of the flap portion, in accordance with the invention, is not present behind or beyond the hinge—in the upper region of the drawing as presented, forming a single-layer rear region 25, which is to remain attached to the package.

It may be noted that hinge line 18 of each flap is in the direction of feed of the roll on which the laminate materials are handled. As is known, a laminate material when released from the roll has a tendency to curl in the circumferential direction of the roll. In some known types of flap this can lead to the flap tending to reclose rather than stay open; the design shown does not suffer from this defect. It may further be noted that in this embodiment the flap is wider than long, further reducing any tendency to curl in the longitudinal direction.

Figure 2:
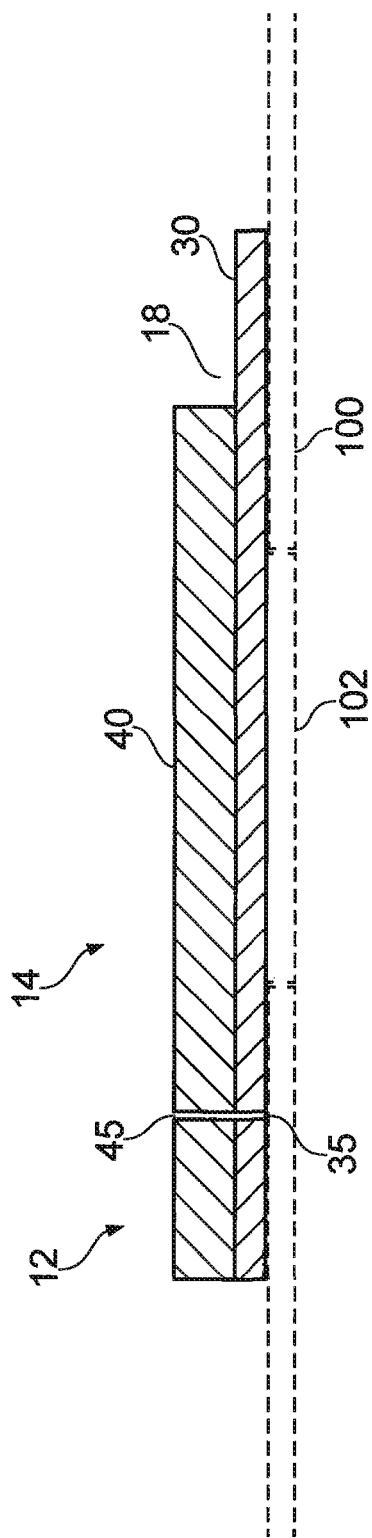
FIG. 2 is a cross-section of part of one such flap device as applied to a package.

This relationship is evident from the very schematic FIG. 2 where a flap device is removed from the release film and applied to a package. FIG. 2 shows a section along the dogleg line 2-2 in FIG. 1. Here the lower 30 and upper 40 layers are visible. The upper layer 40 is generally thicker, in this embodiment 175 μm thick, and made of PET. This material has excellent rigidity properties: that is, it retains its flat shape after repeated uses. It adheres to the 50 μm-thick lower layer 30 of PP over most of its extent, including either side of the cut 15, which passes through both layers at 45 and 35 respectively. Only in the region beyond the hinge is the label flap formed by the lower layer 30 only. This means that the cut-out flap portion 14, consisting of both upper and lower layers, is free to pivot about the weaker single-layer hinge region 18. Moreover, it is found that the flap, once opened, will lie back against the packaging and after use is easy to close again.

Also shown in FIG. 2, though in dashed lines only, is the foil 100 of the package to which the label flap is applied. To this end the lower layer 30 has a layer of adhesive on its underside, not shown. As can be seen, the flap 14 covers the hole 102 from which moist wipes, or other contents, are to be extracted, while the hinge 18 is a short distance to the side of the hole. In fact, the hole will usually be made by the user on first use of the package, the outline of the hole being defined by a weak perforation which is then torn open by the attachment of the foil to the flap portion, as shown.

Figure 3:
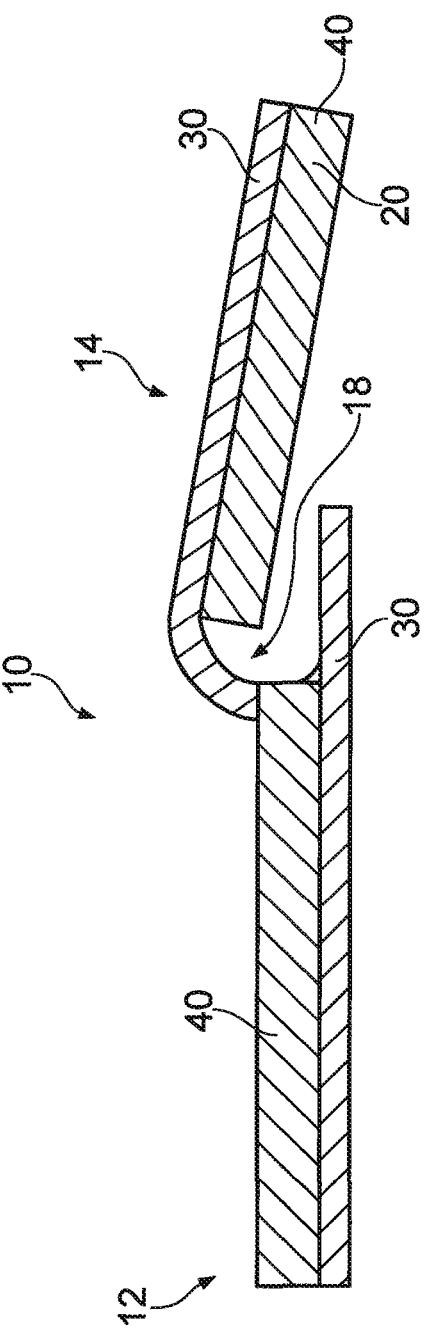
FIG. 3 is a cross-section of part of one such flap device in the open condition.
Figure 4:
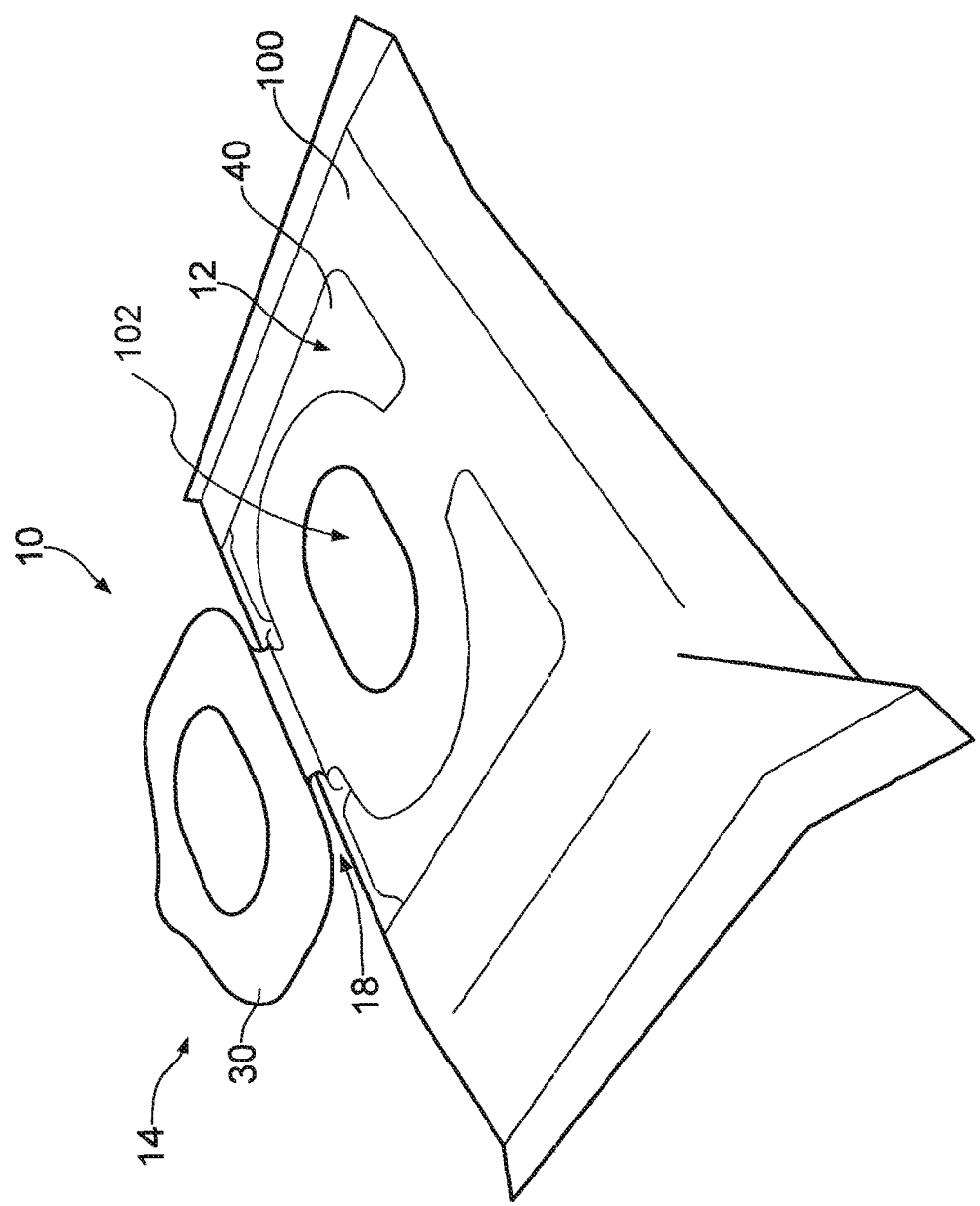
FIG. 4 is a 3D schematic view of a flap device applied to a package, the device being shown with the flap portion in the open (deployed) condition, allowing access to contents of the package.

FIG. 3 is a cross-sectional view of a flap device 10 with the flap 14 in the open condition, leaving the frame 12 in place. The drawing is likewise very schematic and does not represent actual thicknesses. FIG. 4 is a corresponding 3D view showing the flap applied to the foil 100 of a package containing moist wipes. The contents of the package are accessed through the hole or aperture 102 formed in the foil 100 that forms a wall of the package.

Returning to FIG. 1, further advantageous features may be noted. First, at two points along the cut 15 defining the flap, the cut is interrupted to form small ties 16. These keep the frame and flap portion together after the flap assembly is removed from the release layer and before it is applied to the package. They can, however, be easily broken by the user on first use of the flap, and they also act as a tamper-check mechanism.

Secondly, the cut 15, which passes through both layers to form the flap portion 14, is also present in the lower layer for a short distance past the point where the upper layer stops. It can be seen that on each side of the flap, or near each end of the hinge 18, a tightly curved cut 17 continues, curving round with a radius of a few mm, starting from the transversely directed line at the rear end of the cut that forms the flap. The cut goes first toward the rear edge (upper in the diagram), then outwardly towards the side edge, then slightly back towards the tab (front) edge. It is known as a "peel break" and its function is to stop a tear in the lower layer if the user opens the flap 14 too enthusiastically: in these circumstances the tear is directed round and does not continue to the rear edge of the lower layer (which would lift the flap off entirely). The peel break construction also has the advantage that a short strip of the lower-layer-only area lifts up and contributes to the flexibility of the hinge.

In use, the user takes hold of the tab 20, which has no adhesive or where the effect of the adhesive is nullified, and pulls it up. This pulling force overcomes the tacky adhesive between the lower layer 30 and the package, though not at the area defined by perforations in the package, where instead the flap lifts the area to form the hole 102. The ties 16 between flap and frame are also broken.

The opening action continues until the flap has lifted along the entire cut line shown as a thick line in FIG. 1. The curve towards the rear, away from the hinge line, enables the hinge region 18 of the flap to lift from the substrate and form a tube of the material of the lower layer, having a relatively large radius, i.e. several times (at least twice) the thickness of the layer. This tube is visible from the side in FIG. 3. Theoretically the cut could be a score that tears on first use. This large radius allows the flap to lie back with only a very small restoring force, much less than the weight of the flap.

The continuing cuts 17 could in theory just go straight back towards the rear edge, but it is better if they curve round as described above, to mitigate the risk of tearing though the entire flap device. The longitudinal extent of the curve might be, say, a third to a half of the longitudinal extent of the flap device behind the flap proper.

To make the laminate flap device, the lower layer has an adhesive-blocking layer applied over the hinge/rear area 25; such a blocking layer may also be applied to the underside of the tab area 20 of the upper layer. Adhesive is then spread over the lower layer and the upper layer is stuck to the lower. A first cut, through the top layer only, is made along the hinge line (and the ends of the frame 12) and the resulting separated rear part of the top layer (uppermost in FIG. 1) is removed. The flap/frame shape is then cut through both layers, along with the peel breaks. When ready, the flap device is removed from the backing and applied to a package.

The variations shown in FIG. 1 will be explained as follows. The top row shows flap portions rounded at the base (i.e. near the hinge 18), the frame continuing for a short distance to surround the flap portion, but not as far as the edge of the lower layer—in fact about the same distance as, or slightly more than, the rearward extent of the curved cut 17. The middle row shows a version where the base of the flap is square, with the peel breaks starting some way in along this base; the cut in the lower layer therefore extends some way in along the hinge line towards the centre. In this embodiment, unlike the first, the frame does not continue towards the rear edge of the lower layer beyond the line of the hinge 18. In the third row the curved cut 15 continues in the lower layer past the square end 18 of the upper layer, so that one could say the hinge is distributed over a certain longitudinal extent of the single-layer portion 25.

Figure 5:
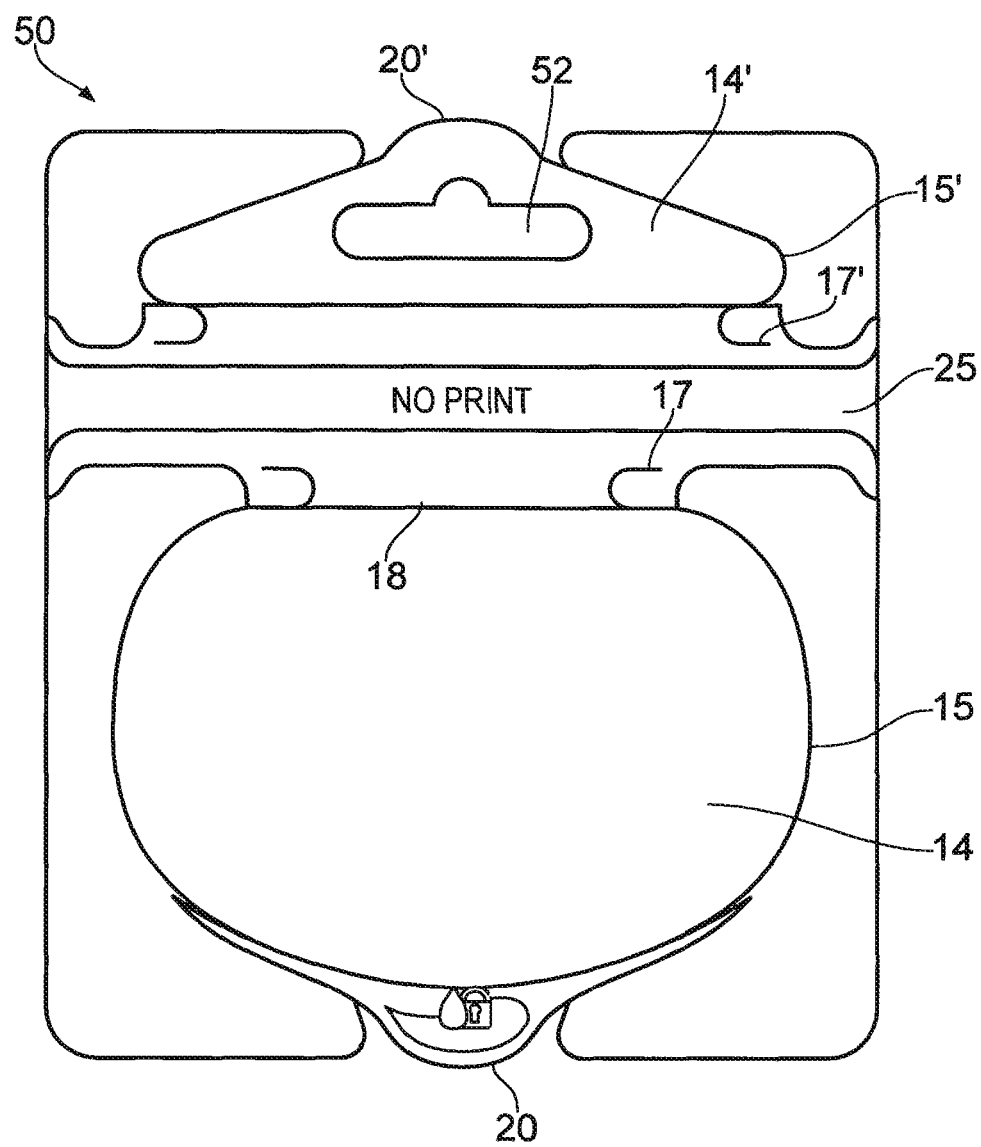
FIG. 5 is an alternative embodiment in which the device incorporates a loop for hanging a package.

FIG. 5 shows a variant in which the rear region 25' of the flap device extends further back in the longitudinal direction, forming a rear section 50, and a second flap-type area 14' formed by retaining a portion of the upper layer 40. The flap is defined by a similar cut 15' through both layers, with the tear-stop curves 17' and hinge region 18' back-to-back, as it were, with that of the package flap 14, and has an adhesive-free tab 20'. It is somewhat more squat in shape than the flap proper 14, and in addition the flap part 14' has a transverse slot 52. This slot, known as a "Euroslot", is used for hanging the package when the closure device has been applied to a package. The upper layer used for the hanging portion will probably be a portion of the same layer as is used for the flap, but it could be formed separately. The slot could of course have a different shape, or just be a simple hole or even a hook.

Figure 6:
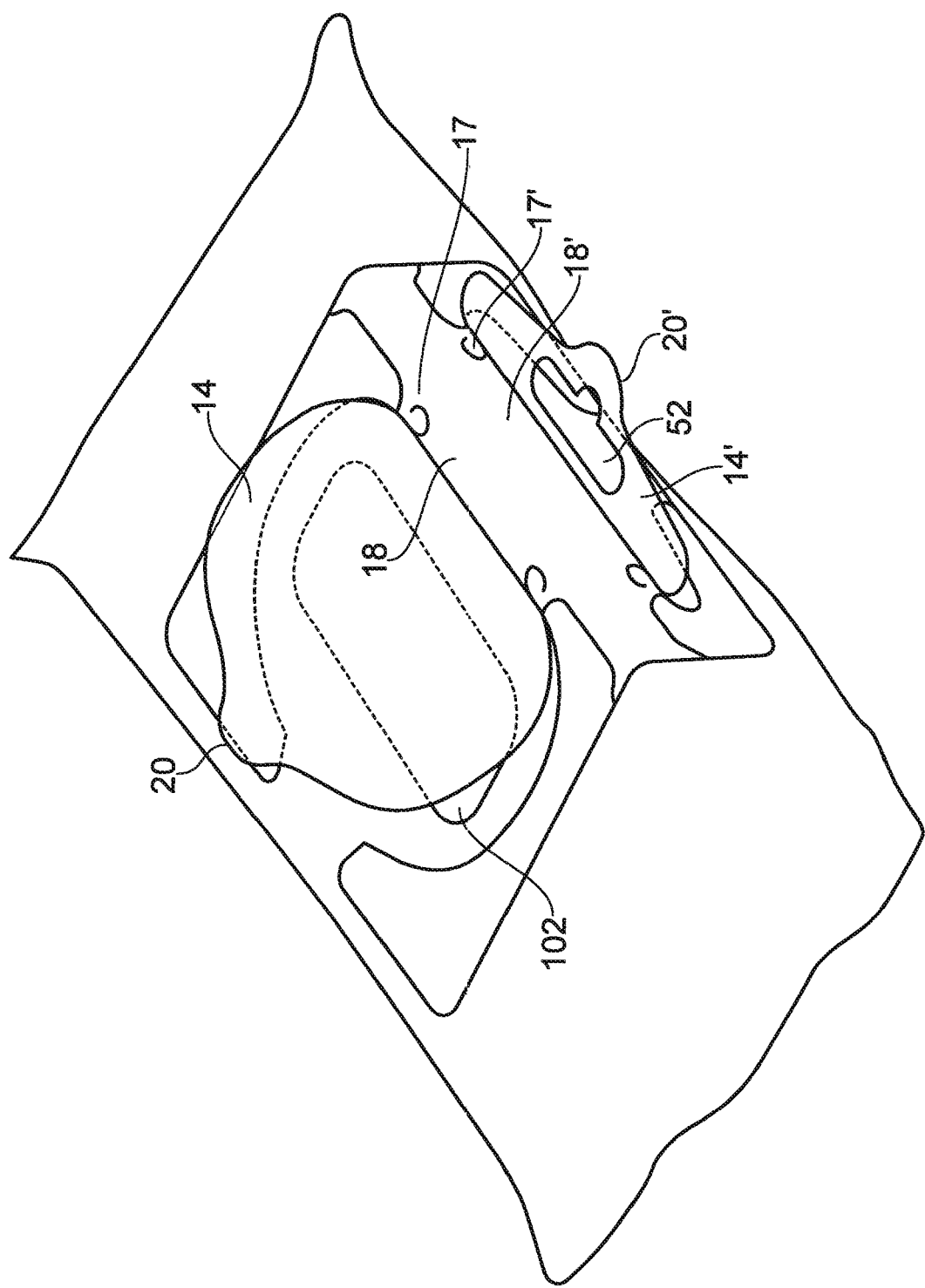
FIG. 6 shows the flap device applied to a package, in the deployed configuration.

FIG. 6 shows a perspective view of the label flap applied to a package, and with the flap 14 and the hanger flap 14' both deployed. This is how the package would appear in use. In a shop the flap 14 would be shut but the package would be suspended by the hanger flap 14'.

In accordance with further aspects of the invention, the integral hanger flap does not have to have the same layer construction as here shown, but could have the layers inverted, or a weakness formed for the hinge line or lines in a different way, such as by partial cutting or scoring.

Figure 7:
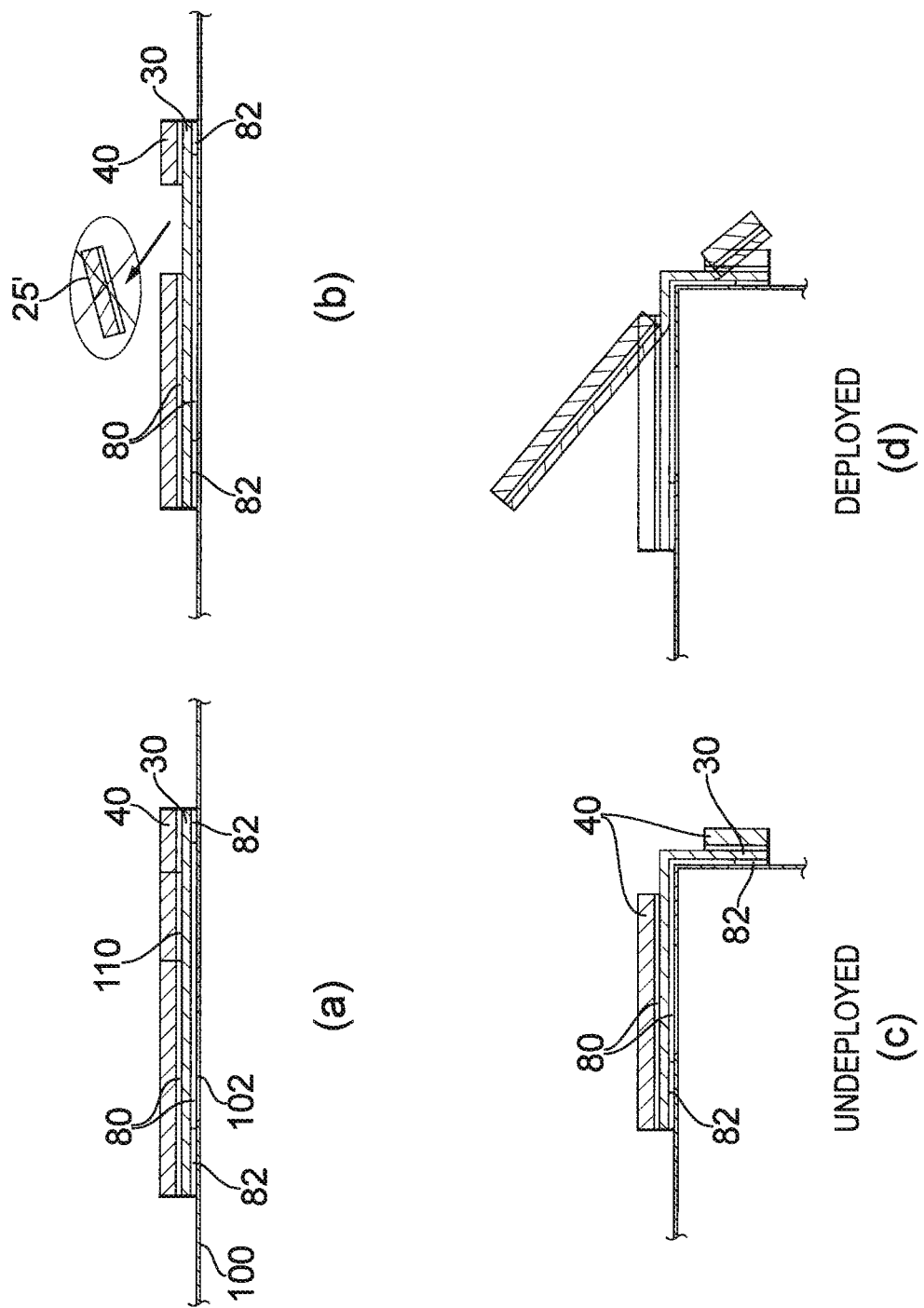
FIG. 7 is a series of schematic sections illustrating the construction of the embodiment.

FIG. 7 shows some schematic sections illustrating the upper and lower layers 40, 30 as before, but also the adhesive layers 80. One adhesive layer 80 sticks together the upper and lower layers of the label flap, and the other sticks the label flap to the package 100. They can be the same or different adhesives. Diagrams (a) and (b) show the manufacturing step where the section 25' of upper layer 30 is removed, following the cutting step forming the outline of the flap 14 and enabled by the presence of a silicone release layer 110. This leaves the single-layer area 25 of the label flap, including the hinge regions for the flap 14 and hanger flap 14'. (The package 100 is also shown, though it would not actually be present during the manufacturing process). The adhesive-kill layers 82 underneath the tabs 20 and 20' are also visible. Diagrams (c) and (d) show the label flap in use undeployed and deployed.

Figure 8:
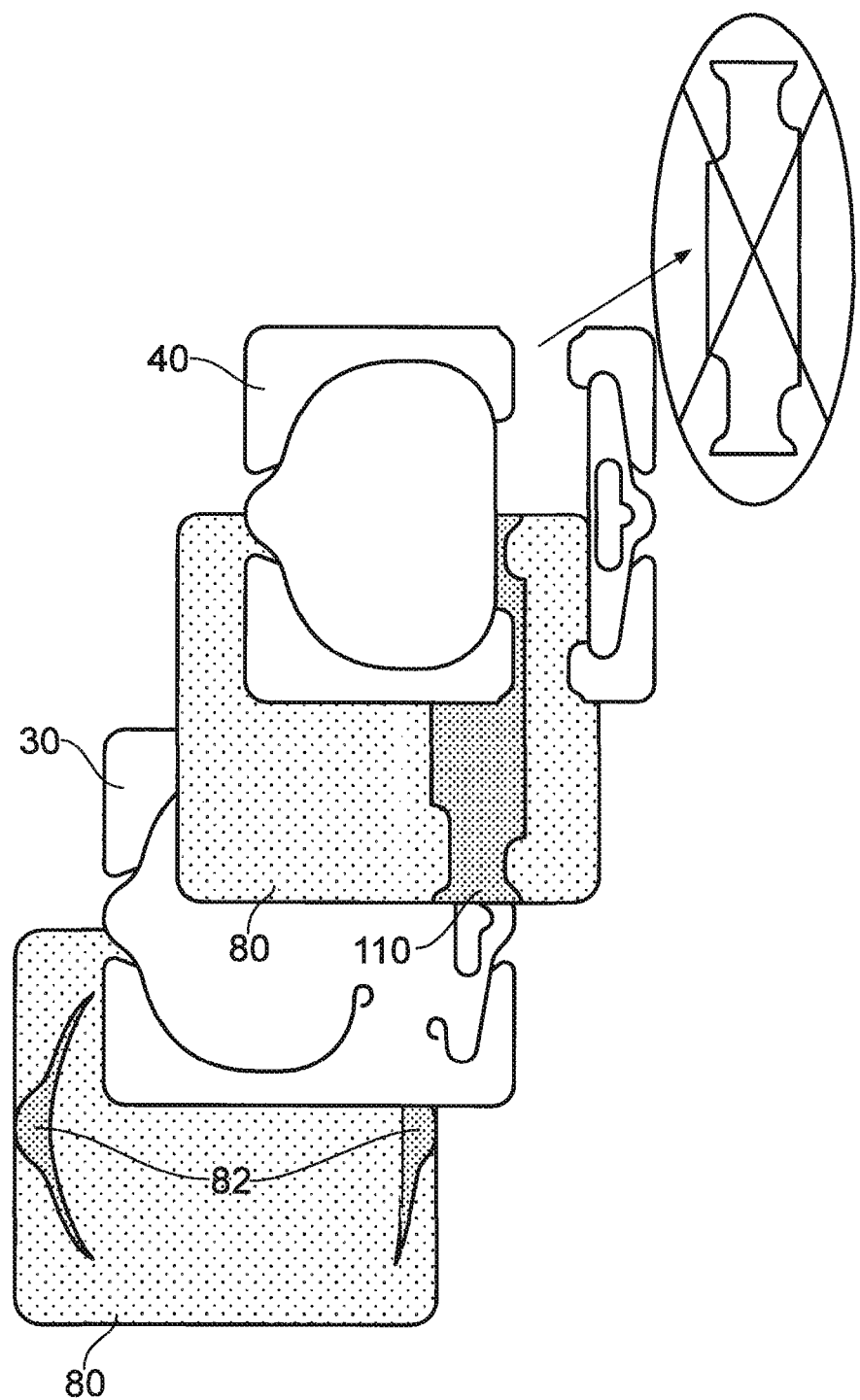
FIG. 8 is an exploded view in plan of the layers of the embodiment.

FIG. 8 shows a plan view, separated into the component layers, of the embodiment of FIG. 5. This shows how the silicone release layer 110 corresponds to the shape of the cut and removed portions 25' of the upper layer.

Figure 9:
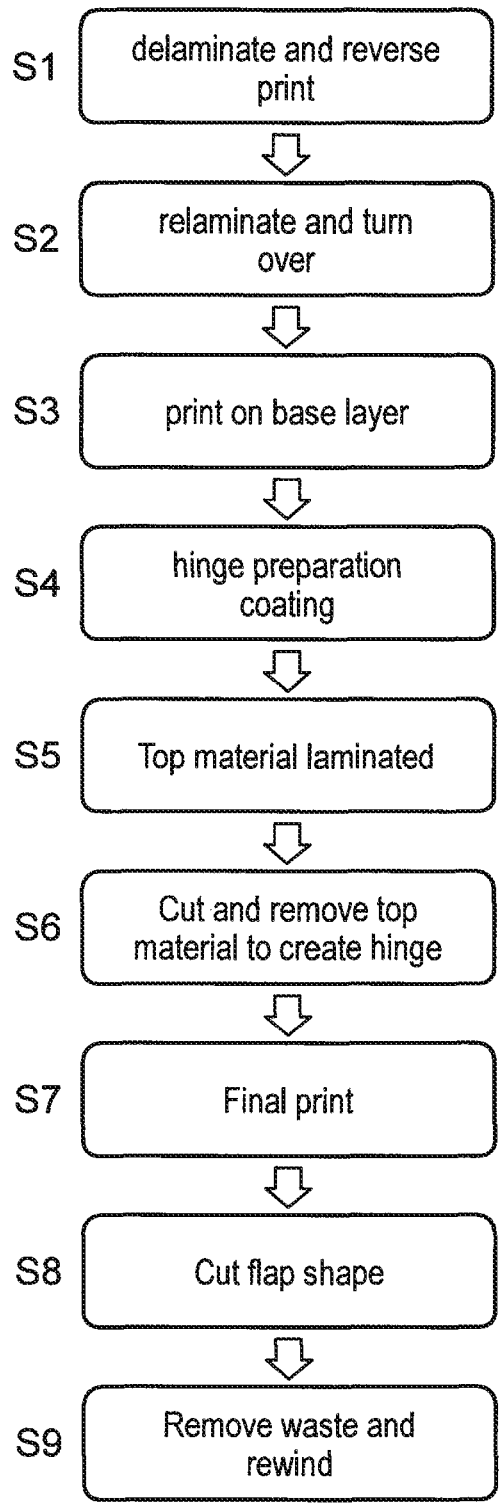
FIG. 9 is a flow chart of a typical manufacturing method.

Finally, FIG. 9 shows a typical sequence of steps in the manufacturing process. First, the roll of backing layer and lower layer (with its layer of adhesive) is fed and the two layers are separated. The adhesive kill layer 82 is applied to the lower layer (Step S1). Then the lower layer is reunited with the backing and the laminate turned over (S2). The silicone release coating 110 is then printed on the base or lower layer 30, with any logos etc. (S3, S4). Then the stiff top layer 40 is laminated onto the lower layer at step S5. The hinge/rear area 25 is cut out and removed, and any final print applied (S6, S7). Finally the flap outline is cut, including the tear stops 17 and the tab 20. The individual flap devices can then be applied to packages as required.

It will be appreciated that, while the embodiments described are envisaged for moist wipes, they could be applied to any packaging where a sealing flap is required.

Throughout the description and claims of this specification, the words "comprise" and "contain" and variations of the words, for example "comprising" and "comprises", means "including but not limited to", and is not intended to (and does not) exclude other moieties, additives, components, integers or steps.

Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith.

The invention claimed is:

1. A method of making a resealable flap device in the form of a sheet for applying to or incorporating in packaging, the method comprising:
   providing a lower layer of flexible material, having an adhesive layer on its lower side;
   bonding an upper layer of material to the lower layer, wherein the upper layer is at least twice as stiff as the lower layer;
   removing a portion of the upper layer in a region where a hinge region is to be formed; and
   forming a cut through both layers to form a flap portion, the cut leaving an edge intact in the hinge region at a rear of the flap portion, behind which is a rear region of the flap device, wherein the cut continues in the lower layer rearwardly beyond a line of the hinge region and curves round towards lateral sides of the flap device so as to inhibit unwanted tearing of the lower layer when the flap is opened.

2. The method according to claim 1, wherein the cut also forms a frame around the flap portion, at least on two sides of the flap portion.

3. The method according to claim 2, wherein the frame extends a distance rearwardly beyond the line of the hinge region, but not as far as an edge of the lower layer.

4. The method according to claim 1, wherein the cut forms in the flap portion, at its front end, opposite the hinge region, a tab to facilitate grasping and opening the flap portion.

5. The method according to claim 1, wherein the lower layer is made of PP and is 40-60 μm thick, and the upper layer is made of PP, PS or PET and is 100-200 μm thick.

6. The method according to claim 1, wherein the removing the portion of the upper layer leaves a second flap portion defined by a further portion of the upper layer, the second flap portion having a slot by which a product may be suspended when the flap device is fixed to the product.

7. The method according to claim 1, wherein the providing a lower layer of flexible material comprises:
   providing the lower layer on a roll with a backing layer;
   separating the lower layer and the backing layer;
   applying an adhesive kill layer to described parts of the lower layer; and
   reuniting the lower layer with the backing layer.

8. The method according to claim 1, further comprising printing a silicone release coating on the lower layer prior to bonding the upper layer to the lower layer.

9. A method of assembling a package including a container for containing products, the method comprising:
   forming a resealable flap device, comprising:
      providing a lower layer of flexible material, having an adhesive layer on its lower side;
      bonding an upper layer of material to the lower layer, wherein the upper layer is at least twice as stiff as the lower layer;
      removing a portion of the upper layer in a region where a hinge region is to be formed; and
      forming a cut through both layers to form a flap portion, the cut leaving an edge intact in the hinge region at a rear of the flap portion, behind which is a rear region of the flap device, wherein the cut continues in the lower layer rearwardly beyond a line of the hinge region and curves round towards lateral sides of the flap device so as to inhibit unwanted tearing of the lower layer when the flap is opened; and
   applying the resealable flap device to the package.

10. The method according to claim 9, wherein the container has a perforated outline of a hole for extracting or inserting the products, and wherein applying the resealable flap device to the package comprises covering the perforated outline of the hole with the resealable flap device.

11. The method according to claim 9, wherein the cut forms in the flap portion, at its front end, opposite the hinge region, a tab to facilitate grasping and opening the flap portion.

12. A method of making a resealable flap device in the form of a sheet for applying to or incorporating in packaging, the method comprising:
   providing a lower layer of flexible material, having an adhesive layer on its lower side;
   bonding an upper layer of material to the lower layer, wherein the upper layer is at least twice as stiff as the lower layer;
   removing a portion of the upper layer in a region where a hinge region is to be formed; and
   forming a cut through both layers to form a flap portion, wherein the cut leaves an edge intact in the hinge region at a rear of the flap portion, wherein the cut continues in the lower layer rearwardly beyond a line of the hinge region and curves round towards lateral sides of the flap device so as to inhibit unwanted tearing of the lower layer when the flap is opened, and wherein the cut forms in the flap portion, at its front end, opposite the hinge region, a tab to facilitate grasping and opening the flap portion.

13. The method according to claim 12, wherein the cut also forms a frame around the flap portion, at least on two sides of the flap portion.

14. The method according to claim 13, wherein the frame extends a distance rearwardly beyond the line of the hinge region, but not as far as an edge of the lower layer.

15. The method according to claim 12, wherein the removing the portion of the upper layer leaves a second flap portion defined by a further portion of the upper layer, the second flap portion having a slot by which a product may be suspended when the flap device is fixed to the product.

\* \* \* \* \*